(12) United States Patent
Jones, IV et al.

(10) Patent No.: US 8,744,511 B2
(45) Date of Patent: Jun. 3, 2014

(54) OUTPUT POWER CONTROL FOR ADVANCED WLAN AND BLUETOOTH-AMP SYSTEMS

(75) Inventors: Vincent K. Jones, IV, Redwood City, CA (US); James M. Gardner, San Ramon, CA (US); Alireza Raissinia, Monte Sereno, CA (US); Ramaprasad Samudrala, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1071 days.

(21) Appl. No.: 12/554,631

(22) Filed: Sep. 4, 2009

(65) Prior Publication Data
US 2011/0059762 A1    Mar. 10, 2011

(51) Int. Cl.
*H04B 7/00* (2006.01)
(52) U.S. Cl.
USPC .......... 455/522; 455/412.1; 455/450; 455/69; 455/127.5; 370/318; 713/320

(58) Field of Classification Search
USPC ............ 455/522, 404.2, 405, 412.1, 450, 69, 455/13.4, 95, 127.1–127.5; 370/310, 318, 370/328; 713/320
See application file for complete search history.

(56) References Cited

U.S. PATENT DOCUMENTS

| 2005/0135284 A1* | 6/2005 | Nanda et al. ................... 370/294 |
| 2007/0037600 A1 | 2/2007 | Fukuda |
| 2008/0025259 A1* | 1/2008 | Ponnuswamy et al. ........ 370/331 |

FOREIGN PATENT DOCUMENTS

| CN | 101040458 A | 9/2007 |
| CN | 101136821 A | 3/2008 |
| EP | 1852982 A1 | 11/2007 |
| JP | 2004297247 A | 10/2004 |
| WO | WO-2005065271 A2 | 7/2005 |

OTHER PUBLICATIONS

International Search Report and Written Opinion—PCT/US2010/047740, ISA/EPO—May 16, 2011.

\* cited by examiner

*Primary Examiner* — Shaima Q Aminzay
(74) *Attorney, Agent, or Firm* — Eric Ho

(57) ABSTRACT

Embodiments of the present disclosure provide techniques for reducing power consumption by wireless devices through transmission output power control.

16 Claims, 12 Drawing Sheets

OUTPUT POWER CONTROL FOR ADVANCED WLAN AND BLUETOOTH-AMP SYSTEMS

TECHNICAL FIELD

Certain embodiments of the present disclosure generally relate to wireless communication and, more particularly, to techniques for transmission power control.

BACKGROUND

In wireless networks, system power consumption during transmission is typically dominated by the current consumption of the transmit power amplifier. Power consumption can be reduced if the output power is reduced. However, reductions in output power impact the upstream transmission range.

Therefore, as a practical matter, output power can be reduced only if the transmission distance (e.g., from a user terminal to an access point) is short relative to the maximum distance if the highest rate. Unfortunately, though, even with short transmission distances, reducing output power can have adverse effects on network behavior. As an example, reducing output power may create "hidden nodes" meaning other devices in the network may not be able to detect the transmissions and may, thus, may communicate in an interfering manner.

Thus, what is needed is a technique to reduce power consumption while avoiding adverse impact on network behavior.

SUMMARY

Certain embodiments provide a method for wireless communications by a wireless node. The method generally includes determining if the wireless node is in proximity to an access point, transmitting a message frame on a wireless channel at a first transmit power to protect one or more subsequent data frames, and transmitting the subsequent data frames on the wireless channel to the access point at a second transmit power that is reduced relative to the first transmit power.

Certain embodiments provide a method of wireless communications by a wireless node. The method generally includes determining if the wireless node is in proximity to an access point, determining the likelihood of the wireless node becoming a hidden node that is not detectable by one or more other wireless nodes if the wireless node were to transmit frames at a reduced transmit power relative to a regular transmit power, and transmitting data frames on the wireless channel to the access point at the reduced transmit power in response to determining the likelihood of the wireless node becoming a hidden node is relatively low.

Certain embodiments provide a wireless node. The wireless node generally includes logic for determining if the wireless node is in proximity to an access point, logic for transmitting a message frame on a wireless channel at a first transmit power to protect one or more subsequent data frames, and logic for transmitting the subsequent data frames on the wireless channel to the access point at a second transmit power that is reduced relative to the first transmit power.

Certain embodiments provide a wireless node. The wireless node generally includes logic for determining if the wireless node is in proximity to an access point, logic for determining the likelihood of the wireless node becoming a hidden node that is not detectable by one or more other wireless nodes if the wireless node were to transmit frames at a reduced transmit power relative to a regular transmit power, and logic for transmitting data frames on the wireless channel to the access point at the reduced transmit power in response to determining the likelihood of the wireless node becoming a hidden node is relatively low.

Certain embodiments provide an apparatus. The apparatus generally includes means for determining if the apparatus is in proximity to an access point, means for transmitting a message frame on a wireless channel at a first transmit power to protect one or more subsequent data frames, and means for transmitting the subsequent data frames on the wireless channel to the access point at a second transmit power that is reduced relative to the first transmit power.

Certain embodiments provide an apparatus. The apparatus generally includes means for determining if the wireless node is in proximity to an access point, means for determining the likelihood of the wireless node becoming a hidden node that is not detectable by one or more other wireless nodes if the wireless node were to transmit frames at a reduced transmit power relative to a regular transmit power, and means for transmitting data frames on the wireless channel to the access point at the reduced transmit power in response to determining the likelihood of the wireless node becoming a hidden node is relatively low.

Certain embodiments provide a computer-program product for wireless communications by a wireless node, comprising a computer-readable medium encoded with instructions. The instructions being executable to determine if the wireless node is in proximity to an access point, transmit a message frame on a wireless channel at a first transmit power to protect one or more subsequent data frames, and transmit the subsequent data frames on the wireless channel to the access point at a second transmit power that is reduced relative to the first transmit power.

Certain embodiments provide a computer-program product for wireless communications by a wireless node, comprising a computer-readable medium encoded with instructions. The instructions being executable to determine if the wireless node is in proximity to an access point, determine the likelihood of the wireless node becoming a hidden node that is not detectable by one or more other wireless nodes if the wireless node were to transmit frames at a reduced transmit power relative to a regular transmit power, and transmit data frames on the wireless channel to the access point at the reduced transmit power in response to determining the likelihood of the wireless node becoming a hidden node is relatively low.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide techniques for reducing power consumption by wireless devices through a control of transmission output power. Different techniques may be employed that may help avoid hidden node problems, such as transmitting protection packets (CTS-self/RTS-CTS messages) at full or higher power to clear the channel before transmitting data packets at reduced power.

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
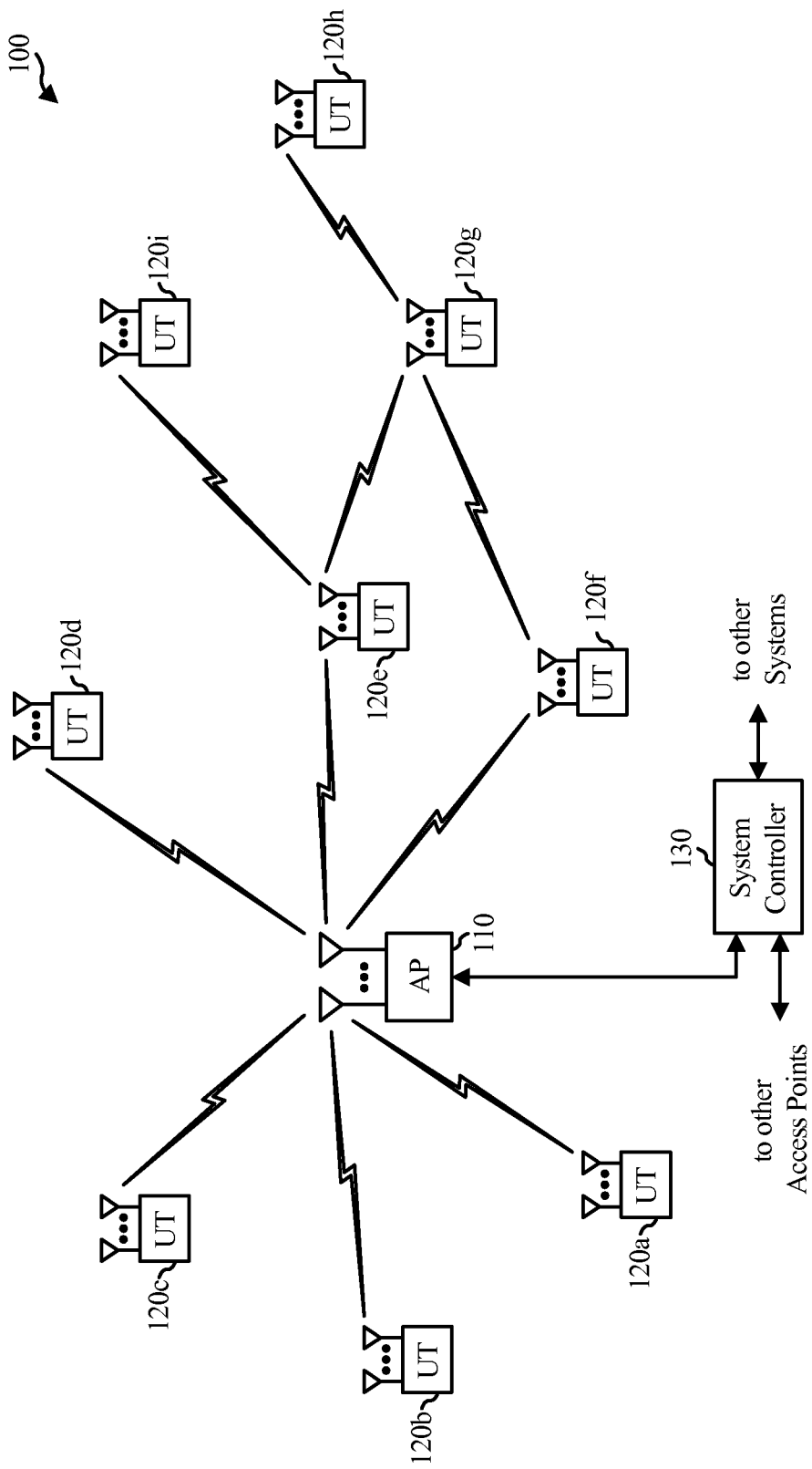
FIG. 1 illustrates an example wireless communication system, in accordance with certain embodiments of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. According to certain aspects, an AP may be a "soft-AP" comprising a mobile device that implements AP functionality, possibly while still serving as a client in some circumstances. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
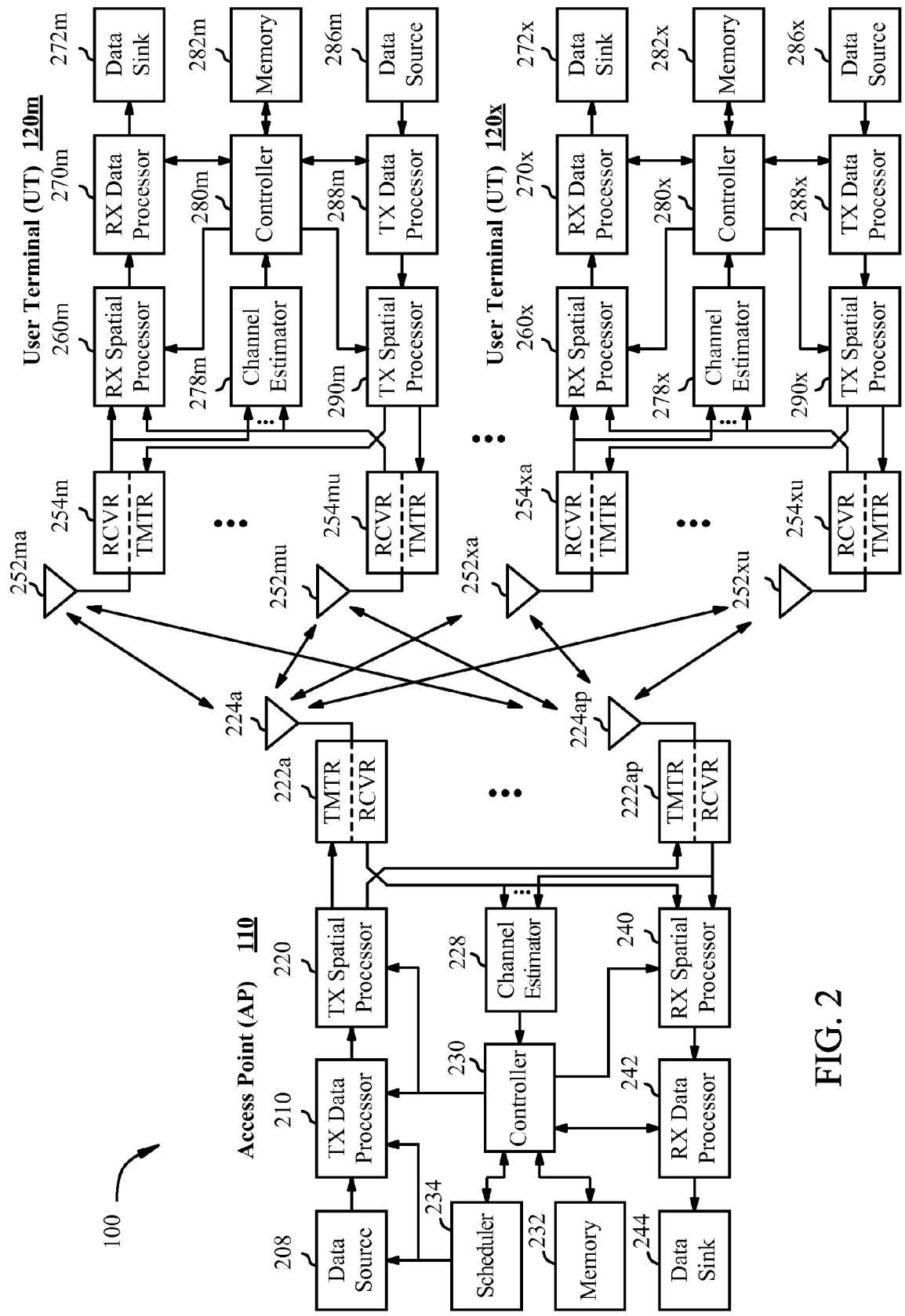
FIG. 2 illustrates various components that may be utilized in a wireless device in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{S_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
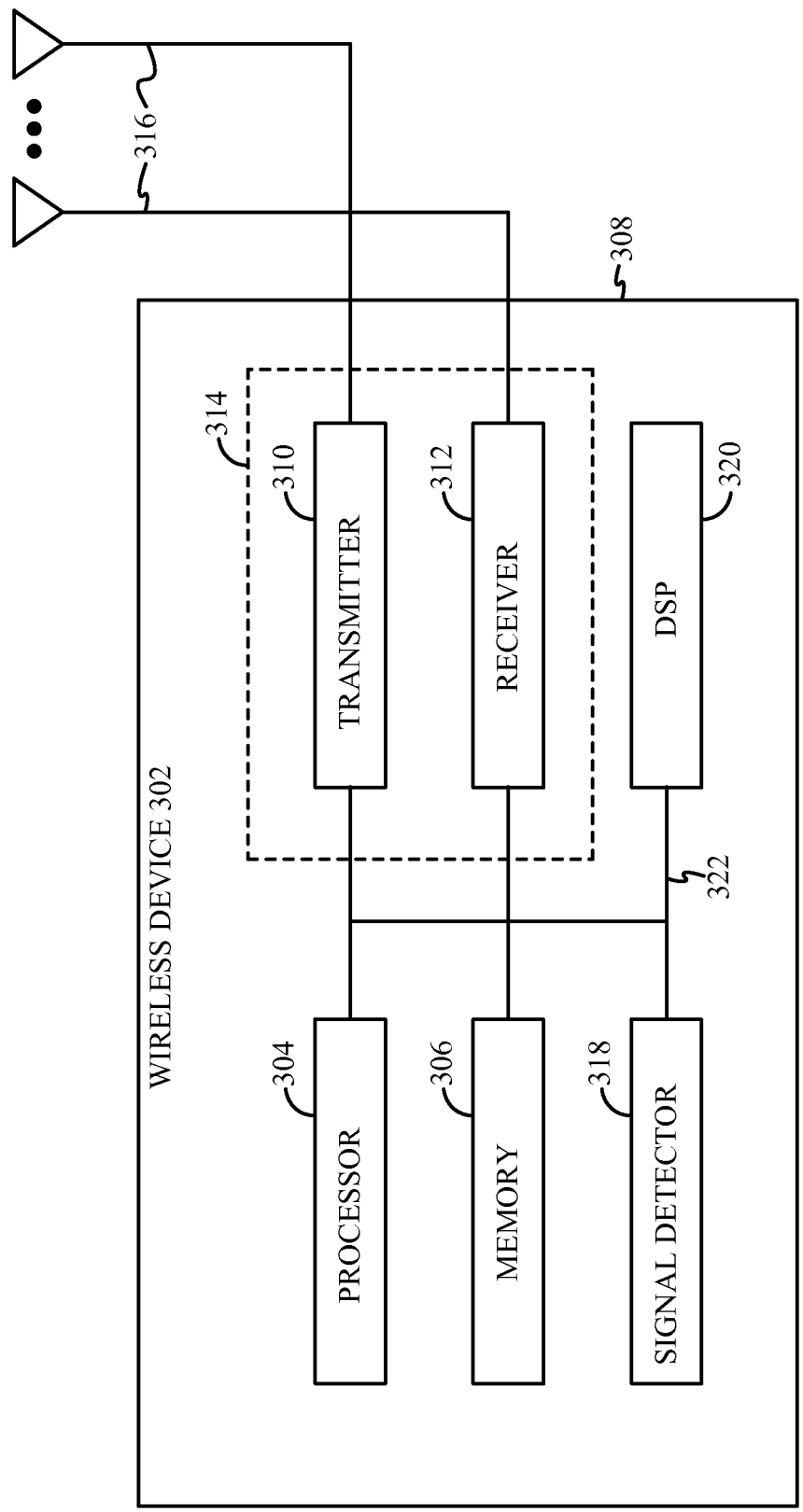
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314.

The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

Output Power Control for Advanced WLAN and Bluetooth-Amp Systems

As noted above, system power consumption during transmission in a client device is typically dominated by the current consumption of a power amplifier. Techniques presented herein may allow power consumption to be reduced, by reducing output power during transmissions while avoiding or reducing the occurrence of hidden node problems.

The techniques may allow a client device to maintain its effective range while maintaining a desired data exchange rate. According to certain embodiments, output power for transmissions from a client device may be reduced in certain instances when the distance to the access point (AP) is relatively short compared to the maximum distance a given radio access technology may provide the highest data rate.

As noted above, one potential issue presented when lowering output power of transmissions from a client device is that the device may become a hidden node to either another client device in the same cell (or network coverage area of an access point) or to a station (AP or client device) in an overlapping cell.

Figure 4:
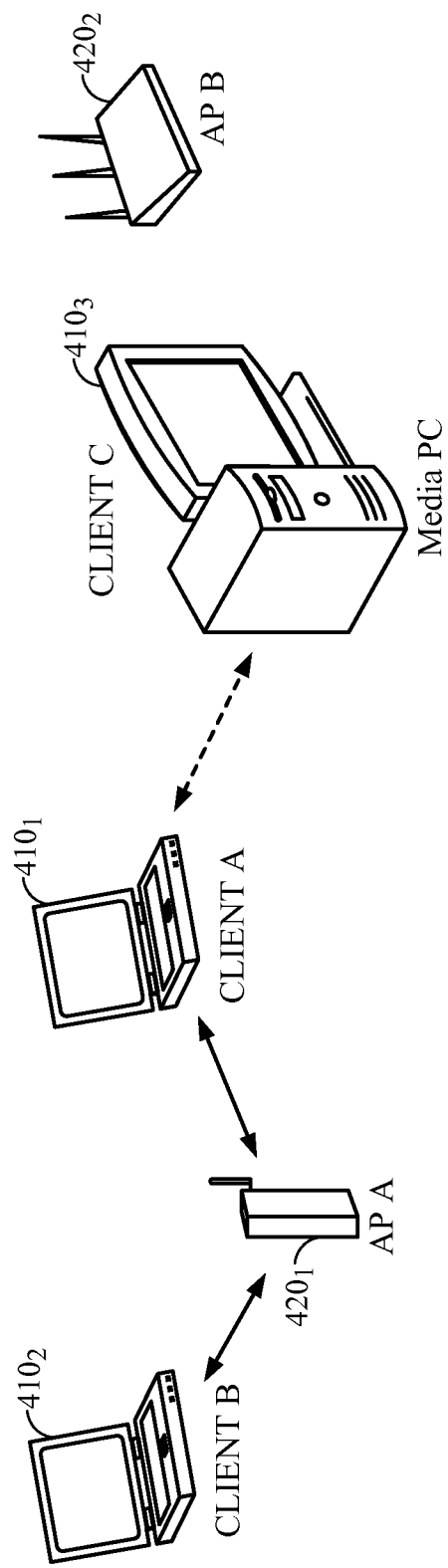
FIG. 4 illustrates an example of a client device reducing output power and becoming a hidden node.

FIG. 4 illustrates an example environment in which a client device might be at risk of becoming a hidden node if it reduces transmit output power. In FIG. 4, Client A $410_1$ and Client B $410_2$ (e.g., lap top computers) are being serviced by a first access point AP A $420_1$ (e.g., a wireless router), while Client C $410_3$ (e.g., a desktop PC) is being serviced by a second access point AP B $420_2$. If Client A reduces power for transmissions, Client C may not be able to detect Client A's transmission and Client A may, thus, become hidden to Client C. As a result, Client C may send transmissions (e.g., to AP B) that interfere with Client A's transmissions to AP A or interfere with client A's reception of an acknowledgement from AP A.

Figure 5:
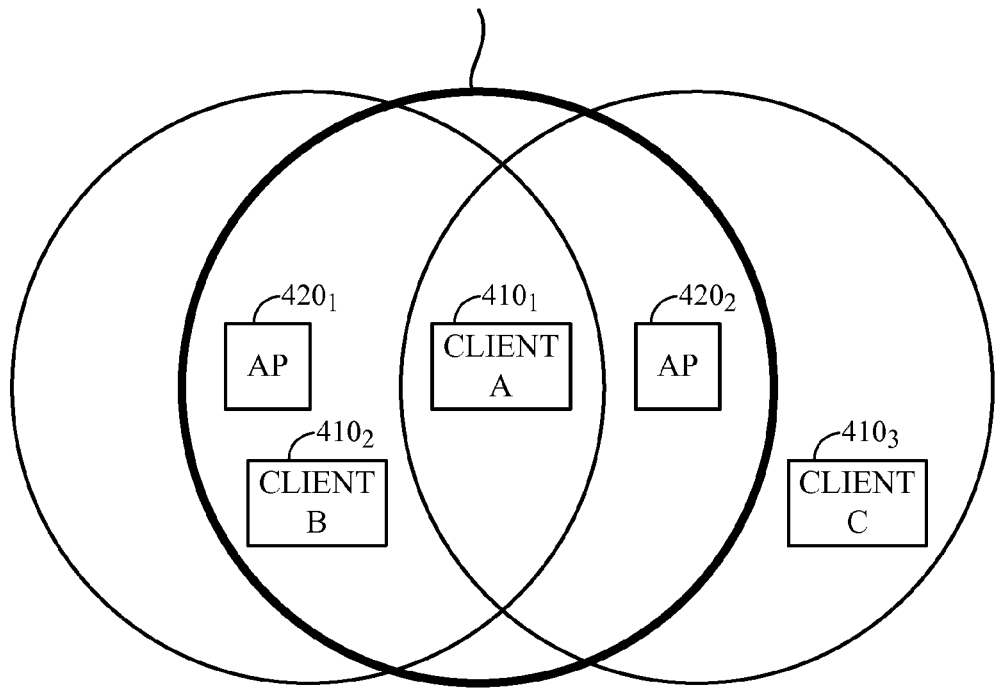
FIG. 5 illustrates an example of two overlapping basic service sets (BSSs).
Figure 6:
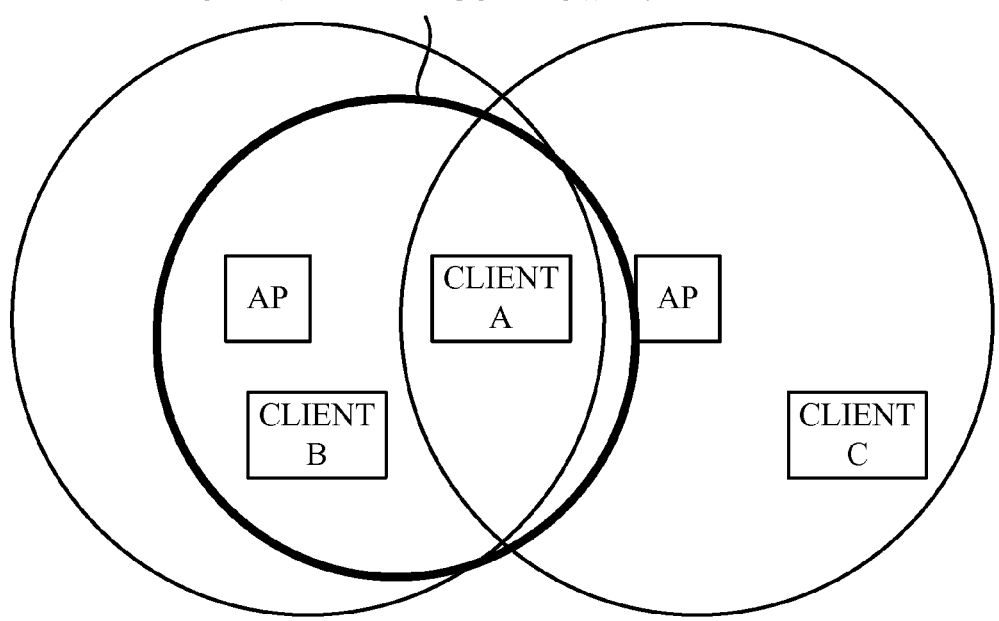
FIG. 6 illustrates the potential of a client device reducing the output power for a transmission and becoming a hidden.

FIGS. 5 and 6 further illustrate how the transmission range of Client A may be altered with reduced transmit power. As illustrated, the basic service sets (BSSs) of AP-A and AP-B may overlap. As illustrated in FIG. 5, at full transmission power, transmissions from Client A may reach AP-B. However, as illustrated in FIG. 6, at reduced transmit power, transmissions from Client A may not reach AP-B. As a result, AP-B may schedule communications in its network in a manner that might interfere with Client A communications.

According to certain embodiments, in an effort to avoid becoming a hidden node for client devices and neighboring access points, a client device may employ certain mechanisms prior to reduced power transmissions. FIGS. 7-11 illustrate the use of different such mechanisms. As will be described in greater detail below, according to certain embodiments, a client device may transmit certain transmissions at full transmit power to "protect" subsequent data transmissions transmitted at reduced power. As an alternative (or in addition), a device may evaluate the likelihood of becoming a hidden node and, while the likelihood is relatively low, the device may send all transmissions at reduced power.

Figure 7:
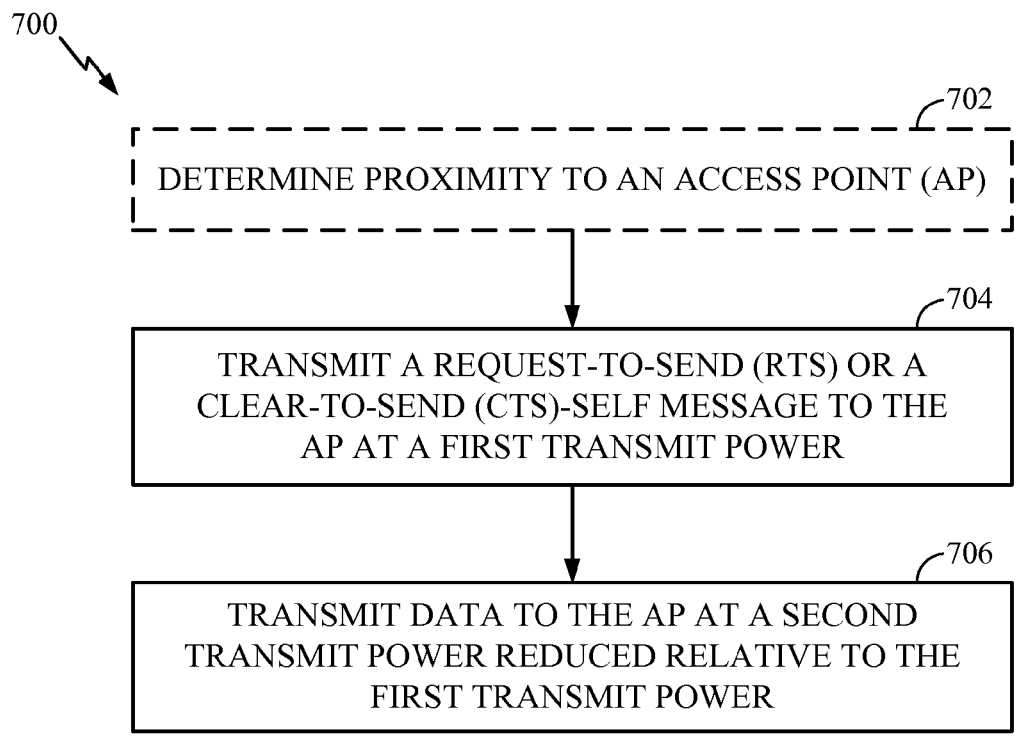
FIG. 7 illustrates example operations for reducing power while remaining "visible" to other nodes in a network.

FIG. 7 illustrates example operations 700 for reducing power while remaining "visible" to other nodes in the network. The operations 700 may be performed, for example, by a client device in an effort to reduce system power consumption.

Operations 700 begin, at 702, with a client device determining its proximity to an access point (AP). For example, the client device may determine whether it is close enough to the AP to reduce the output power while maintaining a desired data rate.

According to certain embodiments, host software (SW) may be used to monitor a Received Signal Strength Indication (RSSI) of packets sent from the AP. Assuming that the downlink is nearly symmetric with the uplink, the host SW may determine if the AP is close enough to enable a reduction of the output power. Since an AP typically has more output power than a client, it may be assumed, conservatively, that the RSSI in downstream data flow is at least 5 dB higher than the corresponding RSSI in the upstream data flow. In certain cases, a device may not need to determine its proximity to an access point prior to performing certain operations described herein. Thus, determination of the proximity may be an optional step (as indicated by the dashed lines in FIG. 7 and subsequent Figures).

At 704, the client device may transmit a request-to-send (RTS) or a clear-to-send (CTS) to-self message (e.g., a CTS message with a destination address of the client device) to the AP at a first transmit power. For example, a client device may send a CTS-to-self message at a regular (non-reduced) output power as a protection frame for subsequent data frames. The RTS or the CTS-to-self message transmitted at regular transmit power may include a duration field (NAV setting) indicating a long enough period to cover the subsequent data transmissions to be sent at reduced power. As a result, any device within the range of the client device when it transmits at full power may detect the RTS or the CTS-to-self message and refrain from potentially interfering communications for that duration while the client device transmits at reduced power.

At 706, the client device may then transmit data to the AP at a second transmit power, reduced relative to the first transmit power. As noted above, these transmissions may be "protected" by the early RTS/CTS message sent at regular transmit power.

According to certain embodiments, a client device may use a Ready-to-Send/Clear-to-Send (RTS-CTS) message exchange for clearing a channel before reduced power data transmissions. For example, if an RTS-CTS message exchange is already being used to protect subsequent data transmissions, then it may be safe to send those data transmissions at reduced power (e.g., provided the desired data exchange rate can be maintained at the reduced power).

Figure 8A:
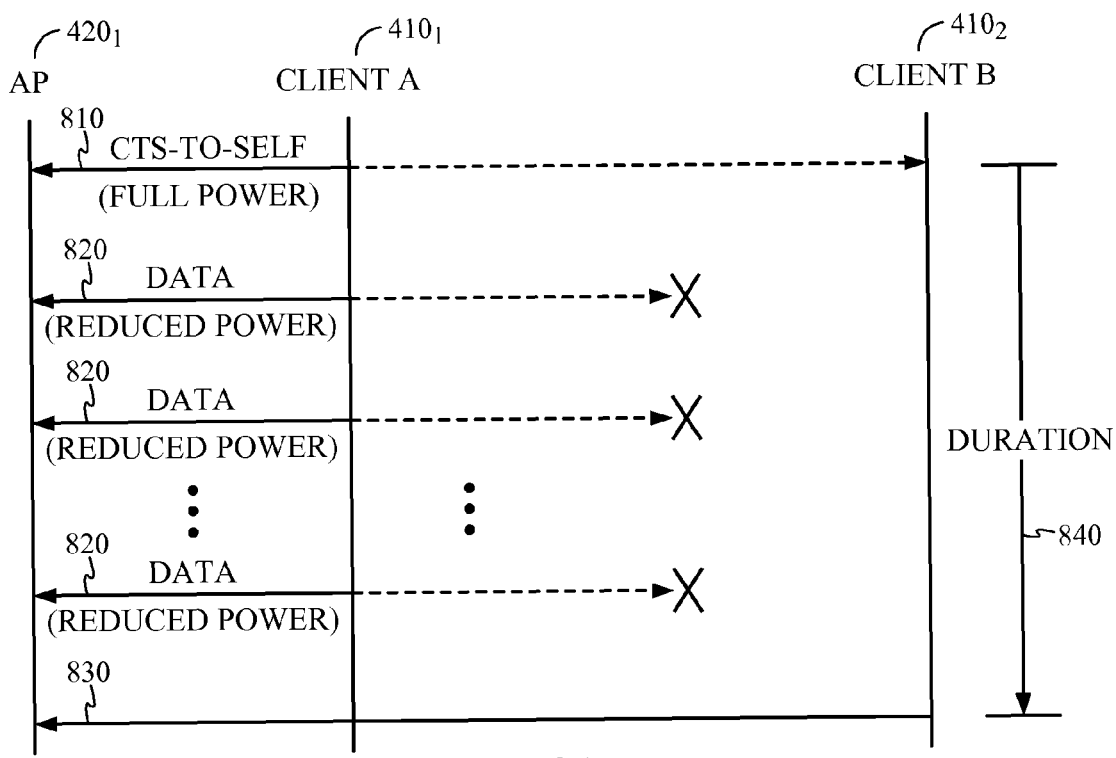
FIGS. 8A-B illustrate the use of a full power CTS-to-self message and a full power RTS-CTS message exchange to protect subsequent data messages transmitted at a reduced power
Figure 8B:
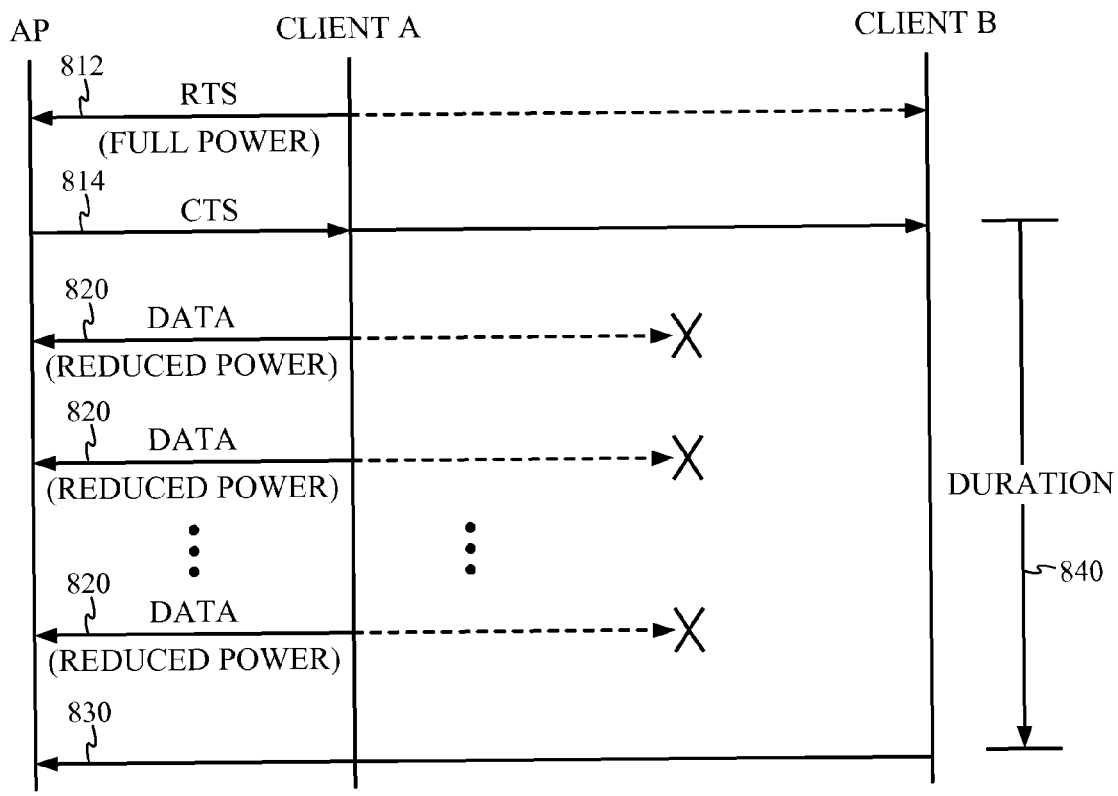

FIGS. 8A-B illustrate the use of a full power CTS-to-self message and a full power RTS-CTS message exchange, respectively, to protect subsequent data messages transmitted at a reduced power.

In the example illustrated in FIG. 8A, client A $410_1$ transmits a CTS-to-self message 810 with sufficient power to reach both a serving AP $420_1$, as well as client B. As noted above, the CTS-to-self message 810 may contain NAV parameters (e.g., timers) indicating a duration 840 for which the channel is reserved. After reserving the channel via the CTS-to-self message 810, the client device 410$_1$ may send one or more data messages 820 at a reduced power for the duration 840. As illustrated, the data frames transmitted at the reduced power level may not reach client B, but there is still no concern of becoming a hidden node as client B is aware of the protected duration from the CTS-to-self message 810. After the previously indicated duration has passed, client B may resume transmissions 830 (e.g., with the AP 820$_1$ or another AP).

FIG. 8B illustrates how a similar protection of reduced power data messages may be achieved through the exchange of RTS/CTS messages 812 and 814 transmitted at full power. As illustrated, by transmitting the RTS message 812 at full power and with the AP 420$_1$ broadcasting a corresponding CTS message 814, the channel may also be reserved for an indicated duration 840.

The power saving achieved by sending data transmissions may be substantial, as illustrated in Table 1 and Table 2 below:

TABLE 1

Average Power Consumption for 10 Mbps streaming with 1250 byte packets without output power control

| Streaming | Time (us) | Power Consumption (mW) | Energy Consumption (uJ) |
|---|---|---|---|
| sleep turn-on | 554.2 | 0.3 | 0.2 |
| RF | 200.0 | 55.0 | 11.0 |
| TX PPDU | 205.8 | 983.0 | 202.3 |
| SIFS | 16.0 | 279.0 | 4.5 |
| RX ACK | 24.0 | 439.0 | 10.5 |
| Average Power Consumption | | | 228.4 (mW) |

TABLE 2

Average Power Consumption for 10 Mbps streaming with 1250 byte packets with output power control

| Streaming | Time (us) | Power Consumption (mW) | Energy Consumption (uJ) |
|---|---|---|---|
| sleep turn-on | 514.2 | 0.3 | 0.2 |
| RF | 200.0 | 55.0 | 11.0 |
| CTS-self | 24.0 | 983.0 | 23.6 |
| SIFS | 16.0 | 279.0 | 4.5 |
| TX PPDU | 205.8 | 428.0 | 88.1 |
| SIFS | 16.0 | 279.0 | 4.5 |
| RX ACK | 24.0 | 439.0 | 10.5 |
| Average Power Consumption | | | 142.3 (mW) |

Table 1 illustrates example average power consumption for a client device exchanging data at a rate of 10 Mbps streaming with 1250 byte packets without output power control. Table 2 illustrates example power consumption for a client device exchanging data at a rate of 10 Mbps streaming with 1250 byte packets with output power control. Comparison of Table 1 and Table 2 shows that power consumption is reduced for many cases (e.g., long data packets) even when a high-power CTS-to-self is transmitted. According to certain embodiments, an algorithm (e.g., in software) may be used to determine if the use of a CTS-to-self message will result in reduced power consumption. While this may result in more complexity in software, it may also result in optimized power savings.

According to certain embodiments, rather than transmit full power protection messages, a device may simply determine when the likelihood of becoming a hidden node when transmitting reduced power transmissions is low. When the likelihood is low, the relatively low risk of becoming a hidden node may be outweighed by the potential savings in power consumption.

Figure 9:
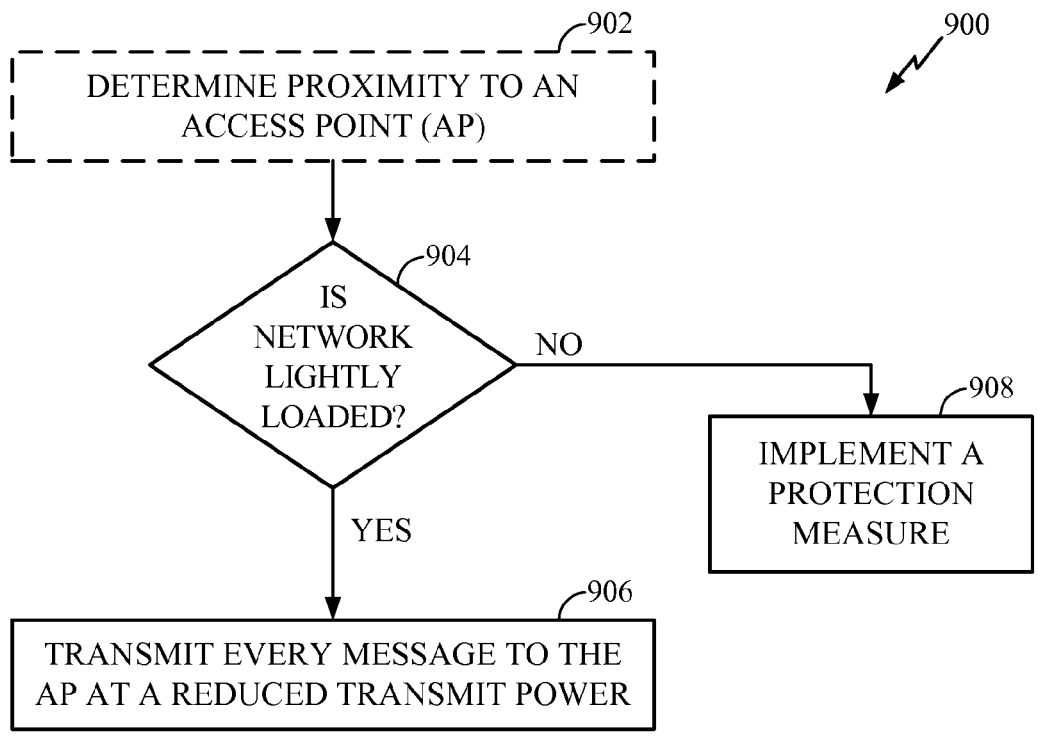
FIG. 9 illustrates example operations for determining that the network is lightly loaded and proceed to transmit every message to the AP at a reduced power

As illustrated in FIG. 9, a client device may perform operations 900 to determine that the network is lightly loaded and proceed to transmit message to the AP at a reduced power, without full power transmissions for protection. Operations 900 begin, at 902, with the client device determining its proximity to an AP. As described above, host software (SW) may be used to monitor a signal to noise ratio (SNR) or RSSI of packets sent from the AP.

At 904, the client device may determine if the network is lightly loaded. This may be done, for example, by monitoring the amount of traffic on the channel through a set of clear channel assessment (CCA) statistics stored by the media access control hardware (MAC HW).

If the network is lightly loaded and the channel is not being utilized by any other devices, the client device may transmit every message to the AP at a reduced power, at 906. For example, the client device SW may enable data packets to be sent using a lower output power without employing full power CTS or RTS messages.

On the other hand, if the network is not lightly loaded, the client device, at 908, may implement a protection measure. For example, the device may transmit a full power RTS or CTS-to-self message or perform a full power RTS-CTS message exchange, as described above, to protect the channel prior to transmitting data messages at a reduced power.

Figure 10:
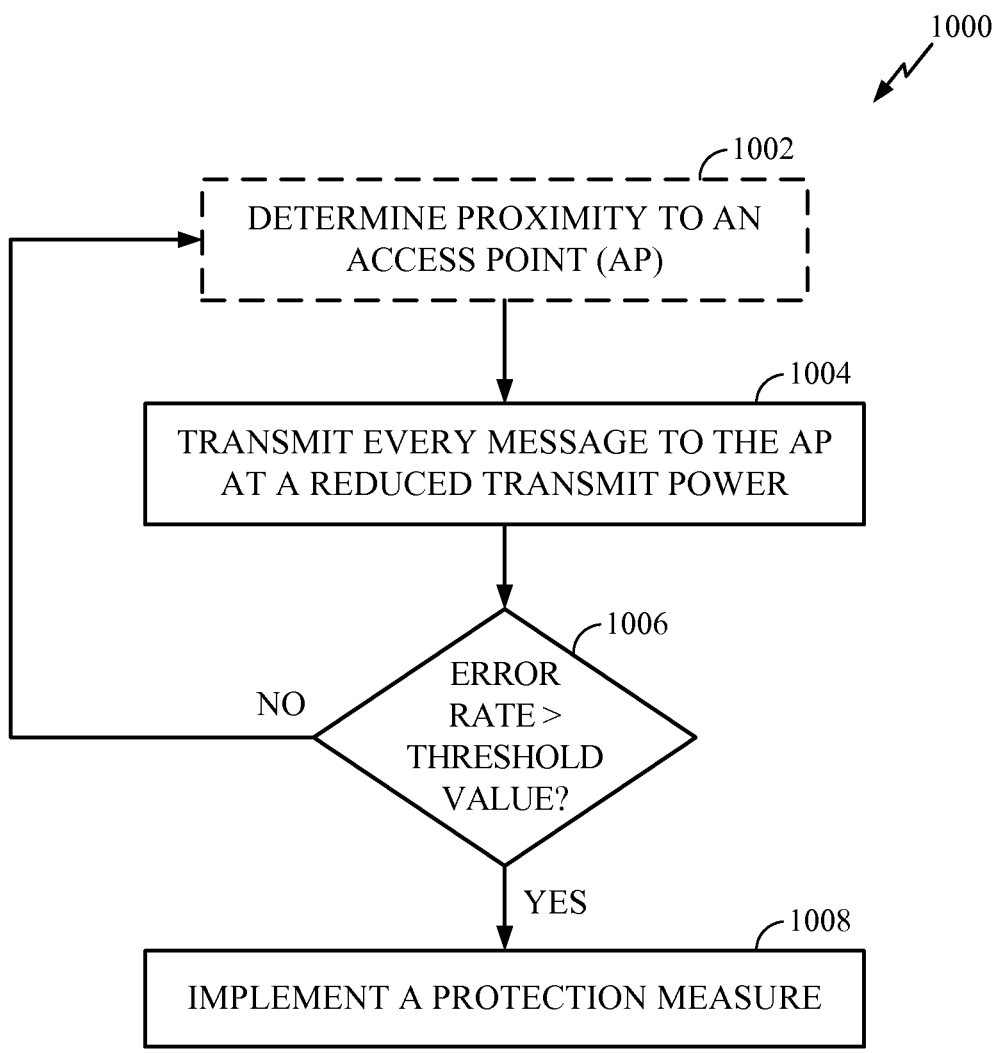
FIG. 10 illustrates example operations for transmitting messages at a reduced output power without protective measures

According to certain embodiments, a client device may begin transmitting at reduced power and monitor an error rate to detect if it has become a hidden node. For example, FIG. 10 illustrates example operations 1000 through which a client device transmit messages at a reduced output power without protective measures, but monitors error rate.

Operations 1000 begin, at 1002, with the client device determining its proximity to an AP, as previously described. At 1004, the client device may proceed to transmit every message to the AP at a reduced transmit power while monitoring error rate. The client device may, at 1006, determine if the error rate of messages transmitted at a reduced output power exceed a threshold value. The threshold value may, for example, represent an allowable error rate in the absence of significant interference. Accordingly, if the error rate of messages transmitted at a reduced output power is less than the threshold value, the potential interference may be deemed acceptable and the client may continue to transmit every message to the AP at a reduced transmit power. On the other hand, if the error rate exceeds the threshold value, the client device, at 1008, may implement a protection measure, as previously described.

Figure 11:
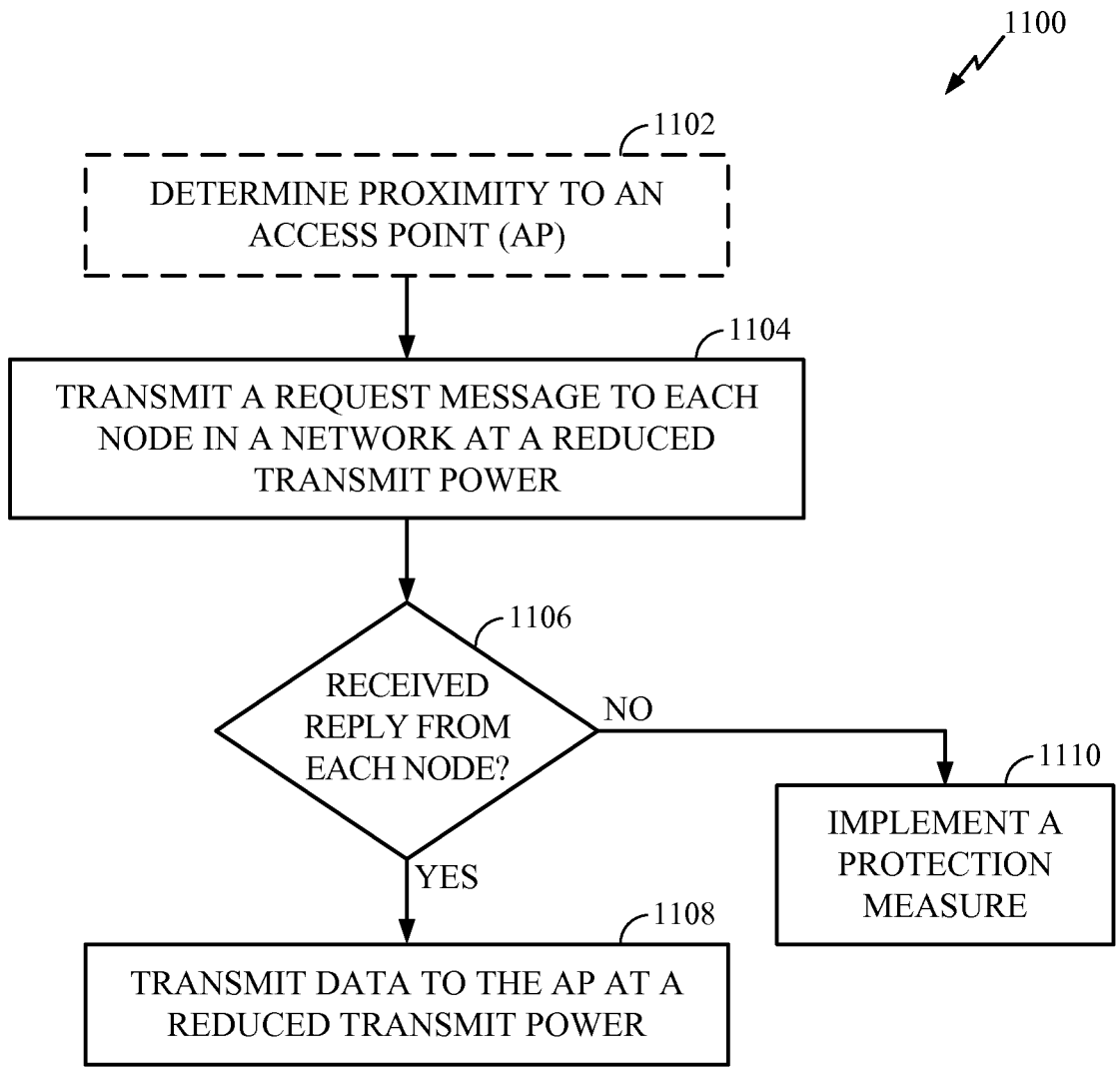
FIG. 11 illustrates example operations performing a direct measurement of the link between the device and each neighboring device before transmitting data messages at a reduced output power

According to certain embodiments, a client device may take action to determine if it is likely to become hidden to one or more nodes if transmitting at a reduced rate. For example, FIG. 11 illustrates example operations 1100 through which a client device may determine if neighboring devices (e.g., neighboring client devices and access points) are within the effective range of the client device when transmitting at reduced power, before actually transmitting data at the reduced power.

Operations 1100 begin, at 1102, with the client device determining its proximity to an AP, as previously described. At 1104, the client device may transmit a low power RTS to each device in the network. At 1106, the client device may determine if a reply has been received from each device. If a CTS is received from each device, the client device may determine each device is within the reduced effective range and that it is safe, at 1108, to transmit data to the AP at the reduced transmit power. However, if a reply is not received from one or more of the other client devices, it may be assumed such devices are out of the reduced effective range and the client device, at 1110, may implement a protection measure, as previously described.

Similar to data frames, which may be transmitted at a reduced output power as previously described, the output power for ACKs may also be reduced for the case when the device is NOT threatened with becoming a hidden node. Otherwise, transmission of ACK frames may be at full power, which might help improve the accuracy of NAV setting on every device (including overlapping BSSs or OBSSs) on the network.

Power Control for Bluetooth (BT) 3.0 Amp

The techniques described above may be utilized in devices that support short and long range communications. For example, certain Bluetooth devices may be required (e.g., by standards) to support a high 802.11g data rate (54 Mbps) at very close distances (e.g., a few inches) similar to other personal area network (PAN) devices. Certain devices may not be able to respond to such high data rate packets at strong signals above (e.g., above −20 dBm). Consequently, it may be beneficial for such devices to be able to discover proximity to another device and reduce output power of transmissions as described herein.

In other words, the previously described embodiments, which may be utilized for power savings benefits, may also be exploited for transmissions to other devices in close proximity. For example, client device SW on a Bluetooth device may determine that another Bluetooth device is in very close proximity through analysis of RSSI and packet error rate and lower the output power of transmissions accordingly. The packet error rate found when transmitting at 54 Mbps may be high when the RSSI approaches or exceeds −20 dBm.

Full power may be used, however, for transmissions to an AP (at long distances). As previously described, the techniques presented herein may help prevent a client device from becoming a hidden node when transmitting low power Bluetooth packets. Similar to the power control case, high power protection packets (CTS-self/RTS-CTS messages) may be utilized to clear the channel before the transmission power is reduced.

According to certain embodiments, an AP may be configured to control when a device should utilize low power transmissions. For example, to facilitate SW aspects of previously described embodiments, a bit-mask programmable by software may be employed in an AP to indicate if the power for transmissions to/from a particular client device should be reduced or not. When a bit is set in the bit-map, it may indicate that the power for the corresponding station needs to be reduced.

A complimentary 3-bit mask may be employed in each client device to indicate what packet types are subject to transmission power reduction. The first bit of the 3-bit mask may correspond to response frames (e.g., ACK and BA frames), while the second bit may correspond to protection frames (e.g., RTS and CTS frames), and the third bit may correspond to data frames (e.g., PPDU, BAR, QOS-null, and CF-end, frames). For example, if a client device N would benefit from transmission power reduction, and the nth 3-bit bit mask was [1,0,1], then response frames (first bit) and data frames (third bit) may be transmitted at a reduced power.

For packet types that require transmission power reduction, the reduced power (specified in a configuration register) may be used even if it is less than the power required by some predetermined value. That is, assuming the bit is set in the bit-map for the nth station, the commanded power may be described by Equation 1

$$\text{Commanded Power}(n) = \min(R2P(\text{rate}(n)), \text{power cap}(n)) \quad \text{Equation 1}$$

Any frames that must be heard by everybody in the cell, regardless of proximity, may be sent at 1 or 6 Mbps (6.5 Mbps for 802.11n networks). These rates can be received at full power by receivers despite a close proximity unlike other data rates.

In some cases, a fair access mechanism may be employed in combination with fragmentation such that nodes transmit by randomly choosing a single transmission opportunity (TX_OP) out of disjoint sets of TX_OPs for every packet sent. A specific client device may access the shared channel more frequently by choosing smaller sets of TX_OP values. When using TX_OP=0, the RTS/CTS message exchange may only protect the first data/acknowledge (ACK) pair. The first data/ACK pair then protects the second pair and so on. However, this may not work when data messages are transmitted at a reduced power, as the first data/ACK pair will be sent at lower power and may be unable to clear the channel completely. RTS/CTS may be used in conjunction with a CF_END (to release the channel). To avoid hidden node issues in this case, fragmentation may be simply not be used when transmitting at reduced power.

Figure 7A:
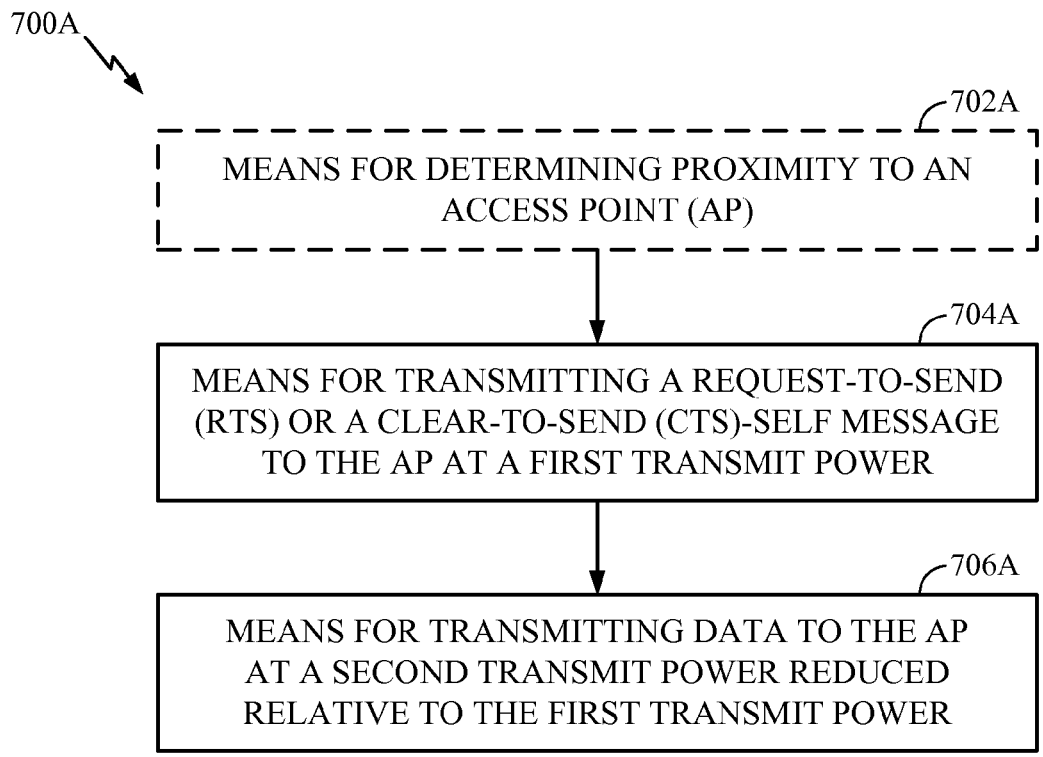
FIG. 7A is a block diagram of means corresponding to the example operations of FIG. 7.
Figure 9A:
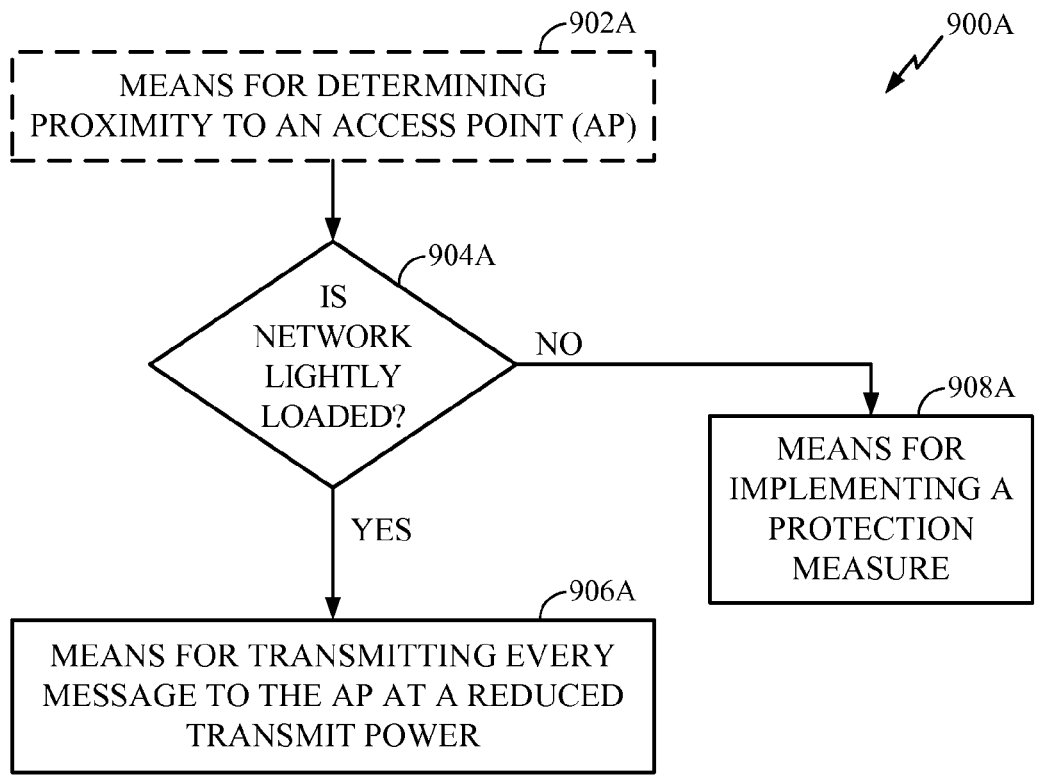
FIG. 9A is a block diagram of means corresponding to the example operations of FIG. 9.
Figure 10A:
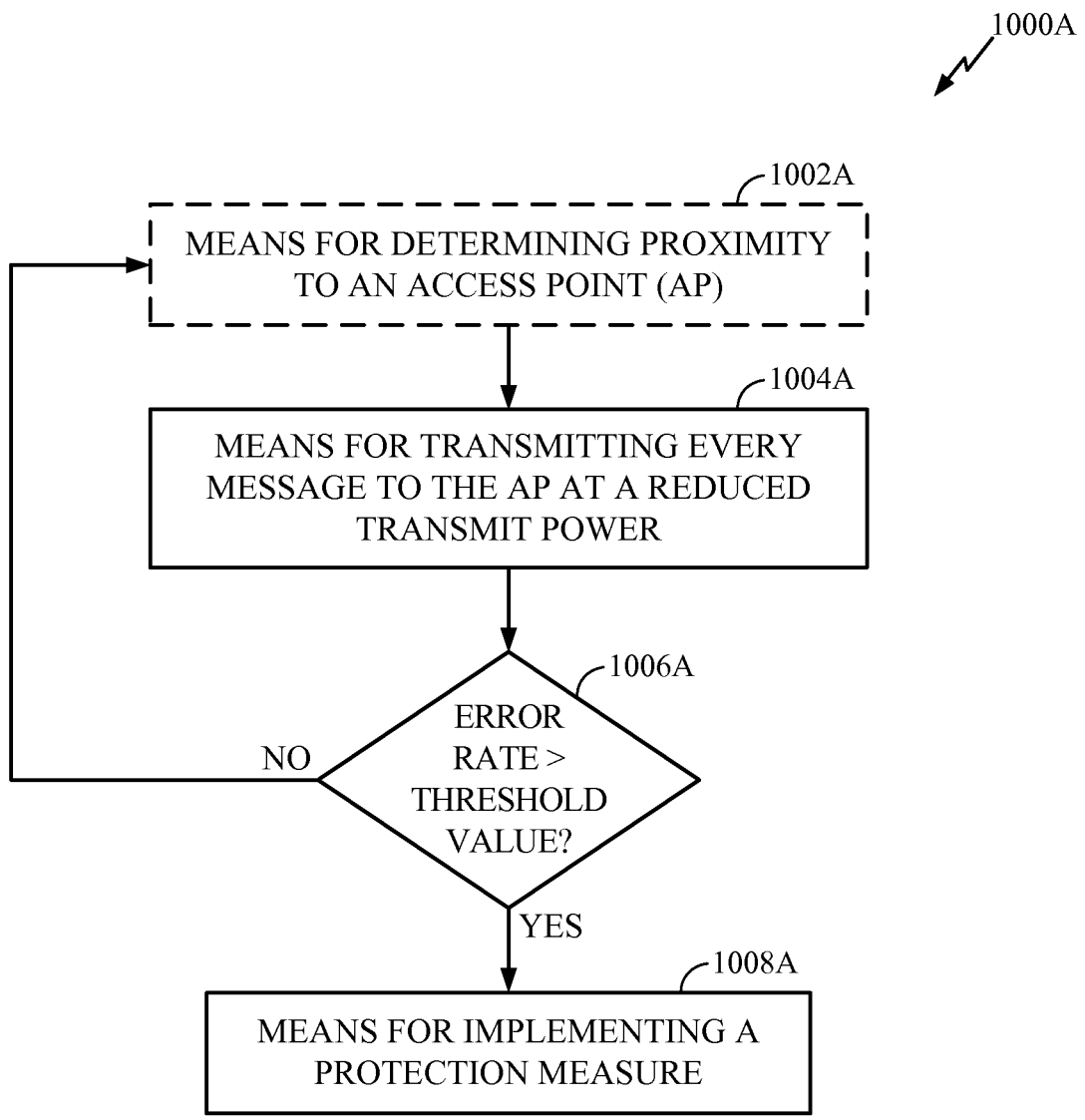
FIG. 10A is a block diagram of means corresponding to the example operations of FIG. 10.
Figure 11A:
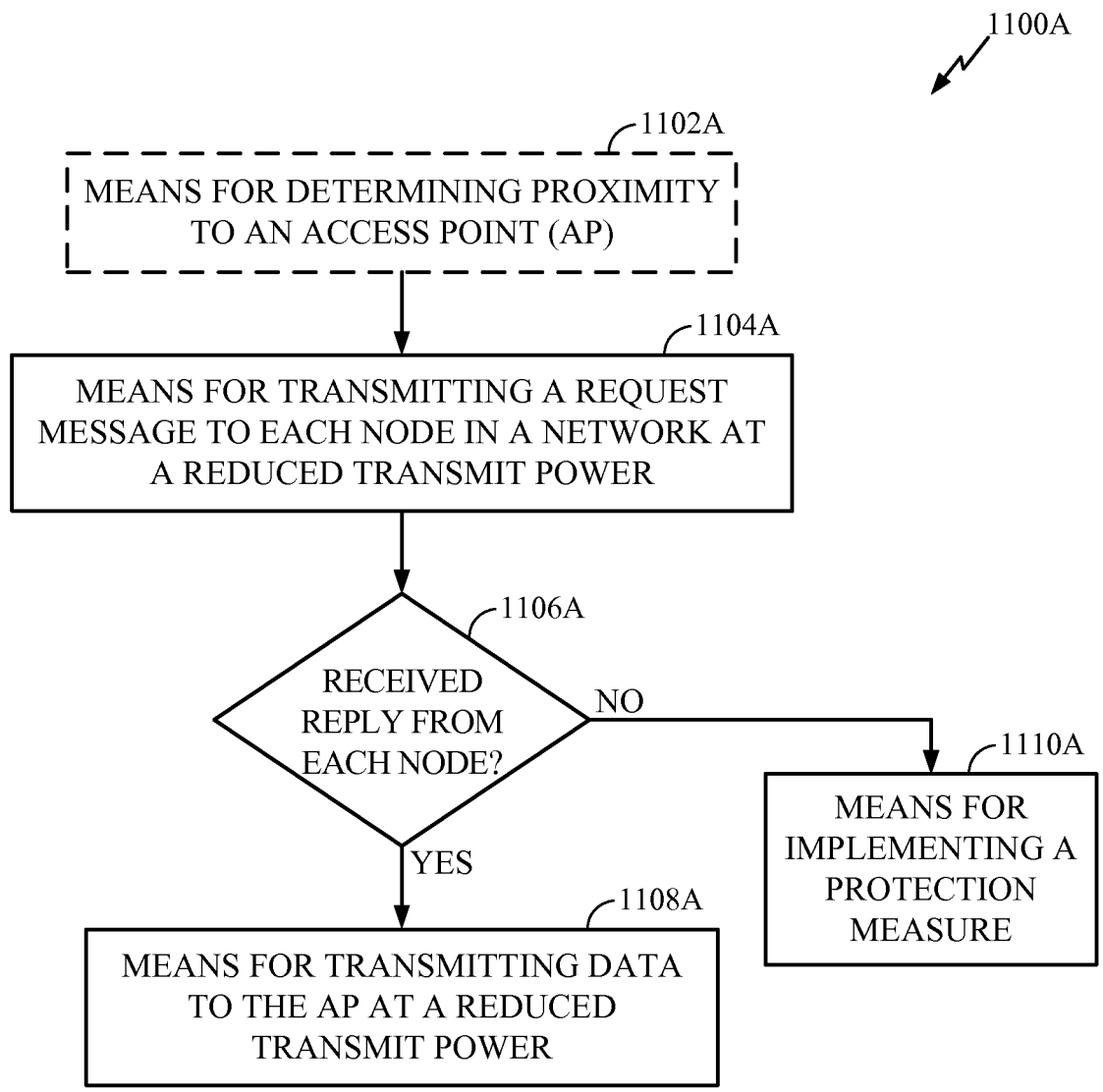
FIG. 11A is a block diagram of means corresponding to the example operations of FIG. 11.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-706 illustrated in FIG. 7 correspond to means-plus-function blocks 702A-706A illustrated in FIG. 7A. Similarly, blocks 902-908 illustrated in FIG. 9 correspond to means-plus-function blocks 902A-908A illustrated in FIG. 9A, blocks 1002-1008 illustrated in FIG. 10 correspond to means-plus-function blocks 1002A-1008A illustrated in FIG. 10A, and blocks 1102-1110 illustrated in FIG. 11 correspond to means-plus-function blocks 1102A-1110A illustrated in FIG. 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a wireless node to an access point, comprising:
    transmitting a message frame on a wireless channel at a first transmit power to protect one or more subsequent data frames, wherein the message frame comprises a clear-to-send (CTS) to self (CTS-to-self) message with a duration field with a value selected to cover transmission of the subsequent data frames; and
    transmitting the subsequent data frames on the wireless channel to the access point at a second transmit power that is reduced relative to the first transmit power.

2. The method of claim 1, further comprising:
    determining the wireless node is in proximity to the access point prior to transmitting the message frame at the first transmit power and the subsequent data frames at the second transmit power.

3. The method of claim 2, wherein determining the wireless node is in proximity to the access point comprises determining the wireless node is close enough to the access point to maintain a desired data rate while transmitting the subsequent data frames.

4. The method of claim 1, wherein the message frame comprises a message frame with a destination address of the wireless node.

5. The method of claim 1, wherein:
    the message frame operates to extend the effective range of the wireless node.

6. A wireless node, comprising:
    logic for transmitting a message frame on a wireless channel at a first transmit power to protect one or more subsequent data frames, wherein the message frame comprises a clear-to-send (CTS) to self (CTS-to-self) message with a duration field with a value selected to cover transmission of the subsequent data frames; and
    logic for transmitting the subsequent data frames on the wireless channel to an access point at a second transmit power that is reduced relative to the first transmit power.

7. The wireless node of claim 6, further comprising:
    logic for determining the wireless node is in proximity to the access point prior to transmitting the message frame at the first transmit power and the subsequent data frames at the second transmit power.

8. The wireless node of claim 7, wherein the logic for determining the wireless node is in proximity to the access point comprises logic for determining the wireless node is close enough to the access point to maintain a desired data rate while transmitting the subsequent data frames.

9. The wireless node of claim 6, wherein the message frame comprises a message frame with a destination address of the wireless node.

10. The wireless node of claim 6, wherein:
the message frame operates to extend the effective range of the wireless node.

11. An apparatus, comprising:
means for transmitting a message frame on a wireless channel at a first transmit power to protect one or more subsequent data frames, wherein the message frame comprises a clear-to-send (CTS) to self (CTS-to-self) message with a duration field with a value selected to cover transmission of the subsequent data frames; and
means for transmitting the subsequent data frames on the wireless channel to an access point at a second transmit power that is reduced relative to the first transmit power.

12. The apparatus of claim 11, further comprising:
means for determining the apparatus is in proximity to the access point; and
means for determining the apparatus is close enough to the access point to maintain a desired data rate while transmitting the subsequent data frames.

13. The apparatus of claim 11, wherein:
the message frame operates to extend the effective range of the wireless node.

14. A computer-program product for wireless communications by a wireless node, comprising a non-transitory computer-readable medium encoded with instructions executable to:
transmit a message frame on a wireless channel at a first transmit power to protect one or more subsequent data frames, wherein the message frame comprises a clear-to-send (CTS) to self (CTS-to-self) message with a duration field with a value selected to cover transmission of the subsequent data frames; and
transmit the subsequent data frames on the wireless channel to an access point at a second transmit power that is reduced relative to the first transmit power.

15. The computer-program product of claim 14, further comprising:
instructions executable to determine the wireless node is in proximity to the access point; and
instructions executable to determine the wireless node is close enough to the access point to maintain a desired data rate while transmitting the subsequent data frames.

16. The computer-program product of claim 14, wherein:
the message frame operates to extend the effective range of the wireless node.

\* \* \* \* \*